(12) United States Patent
Jaakkola

(10) Patent No.: US 9,554,327 B2
(45) Date of Patent: *Jan. 24, 2017

(54) SYSTEM COORDINATED WLAN SCANNING

(71) Applicant: NOKIA TECHNOLOGIES OY, Espoo (FI)

(72) Inventor: Mikko Jaakkola, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,025

(22) Filed: Jul. 2, 2014

(65) Prior Publication Data

US 2014/0313962 A1    Oct. 23, 2014

Related U.S. Application Data

(63) Continuation of application No. 11/377,454, filed on Mar. 17, 2006, now Pat. No. 8,856,311.

(30) Foreign Application Priority Data

Jun. 30, 2005    (EP) .................................. 05014203

(51) Int. Cl.
*G06F 15/173*    (2006.01)
*H04W 48/00*    (2009.01)
(Continued)

(52) U.S. Cl.
CPC ............ *H04W 48/17* (2013.01); *H04W 4/02* (2013.01); *H04W 48/14* (2013.01); *H04W 48/16* (2013.01);
(Continued)

(58) Field of Classification Search
CPC ...... H04W 84/12; H04W 24/00; H04W 48/18; H04W 12/189; H04W 48/10; H04W 48/16; H04W 52/0258; H04W 4/02; H04W 48/17; H04W 48/14
See application file for complete search history.

(56) References Cited

U.S. PATENT DOCUMENTS 5,794,146 A    8/1998  Sevcik et al.
5,799,154 A    8/1998  Kuriyan
(Continued)

FOREIGN PATENT DOCUMENTS

DE    103 33 287 A1    3/2005
EP    1 176 781 A2    1/2002
(Continued)

OTHER PUBLICATIONS

Springer Link, "Selective Channel Scanning for Fast Handoff in Wireless LAN Using Neighbor Graph", Personal Wireless Communications, Lecture Notes in Computer Science vol. 3260, 2004, pp. 194-203.

(Continued)

*Primary Examiner* — Philip Chea
*Assistant Examiner* — Mohammed Ahmed
(74) *Attorney, Agent, or Firm* — Squire Patton Boggs (US) LLP

(57) ABSTRACT

The invention proposes a scan control device, wherein in the scan operation a network detection is performed, the device comprising a request receiving means for receiving at least one request for providing scan information, and a scan control means for performing a scan operation independently from receiving the scan information requests. The invention also proposes a corresponding method and a computer program product.

24 Claims, 2 Drawing Sheets

(51) Int. Cl.
*H04W 48/16* (2009.01)
*H04W 48/14* (2009.01)
*H04W 52/02* (2009.01)
*H04W 4/02* (2009.01)
*H04W 84/12* (2009.01)
*H04W 24/10* (2009.01)

(52) U.S. Cl.
CPC ......... *H04W 52/0258* (2013.01); *H04W 24/10* (2013.01); *H04W 84/12* (2013.01); *Y02B 60/50* (2013.01)

(56) References Cited

U.S. PATENT DOCUMENTS

| | | | |
|---|---|---|---|
| 6,807,163 | B1 | 10/2004 | Shi |
| 7,313,365 | B2 | 12/2007 | Giacalone |
| 7,529,957 | B2 | 5/2009 | Krantz et al. |
| 7,561,545 | B2 | 7/2009 | Abdel-Kader |
| 7,583,643 | B2 | 9/2009 | Smith et al. |
| 7,965,675 | B2 | 6/2011 | Rahim |
| 7,969,907 | B2 | 6/2011 | Shah et al. |
| 7,996,505 | B2 | 8/2011 | Krantz et al. |
| 2001/0006892 | A1 | 7/2001 | Barnett et al. |
| 2002/0018456 | A1 | 2/2002 | Kakemizu et al. |
| 2002/0080752 | A1 | 6/2002 | Johansson et al. |
| 2003/0140130 | A1 | 7/2003 | Evrard et al. |
| 2003/0158922 | A1 | 8/2003 | Park |
| 2004/0052231 | A1 | 3/2004 | Ramaswamy et al. |
| 2004/0057384 | A1 | 3/2004 | Le et al. |
| 2004/0093398 | A1 | 5/2004 | Tang et al. |
| 2004/0110530 | A1 | 6/2004 | Alone et al. |
| 2004/0120278 | A1 | 6/2004 | Krantz et al. |
| 2004/0176024 | A1 | 9/2004 | Hsu et al. |
| 2004/0236851 | A1 | 11/2004 | Kuan et al. |
| 2005/0059397 | A1 | 3/2005 | Zhao |
| 2005/0068928 | A1 | 3/2005 | Smith et al. |
| 2005/0080884 | A1 | 4/2005 | Siorpaes et al. |
| 2005/0097199 | A1 | 5/2005 | Woodard et al. |
| 2005/0163078 | A1 | 7/2005 | Oba et al. |
| 2005/0191987 | A1 | 9/2005 | Zhao et al. |
| 2005/0245269 | A1 | 11/2005 | Demirhan et al. |
| 2006/0135068 | A1 | 6/2006 | Jaakkola et al. |
| 2006/0185012 | A1 | 8/2006 | Olivereau et al. |
| 2007/0286143 | A1 | 12/2007 | Olson et al. |
| 2008/0052754 | A1 | 2/2008 | Iga |

FOREIGN PATENT DOCUMENTS

| | | |
|---|---|---|
| EP | 1 257 090 A1 | 11/2002 |
| EP | 1 392 022 A2 | 2/2004 |
| EP | 1 463 257 A1 | 9/2004 |
| EP | 1 526 682 A2 | 4/2005 |
| EP | 1 732 266 A1 | 6/2005 |
| EP | 1 517 572 A1 | 12/2006 |
| JP | 2000-259790 A | 9/2000 |
| JP | 2001-101351 A | 4/2001 |
| WO | 03/065682 A1 | 8/2003 |

OTHER PUBLICATIONS

Li, W.; Qing-An Zeng; Agrawal, D.P., "A reliable active scanning scheme for the IEEE 802.11 MAC layer handoff," Radio and Wireless Conference, (2003): pp. 71-74.

SYSTEM COORDINATED WLAN SCANNING

RELATED APPLICATION

This application is a Continuation of U.S. application Ser. No. 11/377,454, filed Mar. 17, 2006, which claims priority from European Patent Application Number 05014203.3, filed Jun. 30, 2005, the contents of which applications are herein incorporated by reference.

BACKGROUND OF THE INVENTION

Field of the Invention

The invention relates to a method and a device for wireless communication by which a scan for access networks can be performed.

Description of the Related Art

This invention is related to a network in which a device for wireless communication may establish a connection to one or more access networks. Examples for such access networks are Wireless Local Area Networks (WLAN), wherein each network is identified by a Service Set IDentifier (SSID).

There are several reasons why a device might connect to a plurality of access networks. Namely, certain applications have needs for different kind of networks. For example, access networks may include a company network, hotspot provider (ISP (Internet Service Provider) & operator) networks and home WLAN networks. Different networks can provide different set of destination networks. Here a couple of examples:

From a company network, it is possible to reach intranet and Internet but it might not be possible to send mails via your person ISP account. From a WLAN home network, you might not be possible to use intranet services. Also, in technologies like UMA (Unlicensed Mobile Access) it might not be possible to carry data over UMA in all operators, so that also in this case it might be necessary to change an access network or to use additionally an alternative access network.

Furthermore, scanning for new access networks might be advantageous in order to get cheaper connection, better performing connection, or to find a current network for a particular service, as described above. Also technologies like location information using WLAN may use extensively scanning.

When connecting to WLAN networks, it is necessary to scan for surrounding WLAN networks to which a WLAN station (STA) may connect. The scanning procedure may be a passive scan, in which the WLAN station listens to beacons delivered from surrounding Access Points (AP), or an active scan, in which the WLAN station sends probe requests and waits for an answer.

Currently, most operating systems provide a basic WLAN API (Application Programming Interface) that allows applications do the scanning of the surrounding WLAN networks. Normally, the scanning is done so that an application triggers a scan request via the API to a corresponding subsystem, which then performs the scan operation. By having all the applications to perform separate scan logic, this can create a situation where the whole system is scanning just about all the times due to one-to-one mapping of all the scan requests.

For example, it is assumed that a WLAN station (e.g., a mobile device) has six applications that each have decided to scan the surrounding networks every two minutes. This situation can result in that the system initiates a scan every 20 seconds, which is very unnecessary in most cases. This has a very large effect on power-consumption. Namely, the situation that the device has to scan every 20 seconds will cause the average power-consumption to go up by 60 mW, which is almost ten times more than a normal basic phone idle power-consumption.

FIG. 3 illustrates about the effects of the scanning to stand-by time. In particular, FIG. 3 shows the WLAN scanning impact on power consumption, wherein a smart phone performing scanning in the passive mode is taken as an example. On the ordinate, the stand-by time is plotted in hours. On the abscissa, the number of scans per hour is plotted. Furthermore, in this example a scan for only one WLAN network, indicated by the SSID (Service Set IDentifier) is carried out.

As clearly derivable from FIG. 3, the stand-by time drastically reduces when the number of scans per hour is increased.

Hence, it is desirable to reduce the scanning operations.

Heretofore, some implementations prohibit a system to do scanning too often, and they are implementing this feature so that the system returns the old scan result if a certain threshold time has not been passed since the previous scan. For example, the Nokia Communicator 9500 does it this way. However, this makes application programming tricky as they do not know if the scan results are actually current or not. Also, this type of behaviour forces all the applications to have separate timers and they wake up separately the application engine processor thus increasing power-consumptions. Hence, this approach does not solve the problem sufficiently.

Furthermore, while a scan operation is performed, sending and receiving of data MPDUs (MAC (Medium Access Control) Protocol Data Unit) is not possible due to implementation limitation or it is very slow, so that the long time needed for the scan results affect applications, in particular applications that have real time requirements like voice. Thus, an increased number of scan operations may be annoying for the user of the WLAN station.

SUMMARY OF THE INVENTION

Hence, it is an object of the present invention to solve the problem mentioned above and to minimize the number of scans.

This object is solved by a scan control device, wherein in the scan operation a network detection is performed, the device comprising a request receiving means (request receiver) for receiving at least one request for providing scan information, and a scan operation control means (scan operation controller) for performing a scan operation independently from receiving the scan information requests.

Alternatively, the above object is solved by a method for controlling a scan operation, wherein in the scan operation a network detection is performed, the method comprising the steps of receiving at least one request for providing scan information, and controlling performing of a scan operation independently from receiving the scan information requests.

Hence, according to the invention, the scan operation is performed independently from the requests for providing scan information.

Therefore, a scan operation does not have to be performed each time such a request is received, but a scan operation can be carried out independently. In this way, only one scan operation is necessary during a particular time period, whereas according to the prior art for example scan operations in the number of the applications were necessary during the same time period.

Hence, the number of scans and, thus, the power-consumption can be considerably reduced.

Hence, according to the invention, an application transparent way of doing scanning is provided so that as many applications as possible could use the same scan results, so that not every application would be doing this scanning on their own.

Advantageous developments are set out in the dependent claims.

For example, the scan operation control means may send scan information which is obtained based on the scan operation. Moreover, the request for providing scan information may be stored in a memory, and the scan information may be sent by referring to the request stored in the memory. That is, a scan request does not have to be processed immediately but can be stored and is pending. When the result is to be sent to the application issued the request, the scan information is sent using information from this request.

Alternatively, the request may be a registration for a scan event. That is, an application can register to the scan event.

Furthermore, a maximum latency value may be received which indicates a maximum delay time by which a scan operation may be delayed. That is, an application requesting the scan operation can indicate which maximum delay time it allows for the scanning operation.

In detail, the request for providing scan information may contain a parameter indicating the maximum latency value.

Alternatively, the maximum latency value may be provided in a separate message.

Furthermore, an interval for performing the scan operation may be set based on the maximum latency value.

In case there are a plurality of requests for providing scan information and a plurality of maximum latency values, the interval may be set based on the minimum value of the maximum latency values.

The network detection may be performed with respect to at least one Wireless Local Area Network (WLAN). That is, the networks in question may be WLAN networks.

The device may be an Application Programming Interface (API).

Moreover, a plurality of application devices may be provided, and the scan control device may be configured to forward scan information to all application devices simultaneously.

The method according to the invention may be realized as a computer program product for a processing device, comprising software code portions for performing the steps of the method according to the invention when the program is run on the processing device. The computer program product may comprise a computer-readable (readable for the processing device) medium on which the software code portions are stored.

In this case, the request to provide scan information may be generated by at least one application module for executing an application.

Furthermore, in case a plurality of application modules are present, the scan control module may forward scan information to all application devices simultaneously. The scan control module may be implemented in an Application Programming Interface (API).

In particular, the processing device may be part of a WLAN apparatus (in more detail, a part of a WLAN host device), so that the computer program may be stored in a memory of the WLAN apparatus.

BRIEF DESCRIPTION OF THE DRAWINGS

The invention is described by referring to the enclosed drawings, in which.

DETAILED DESCRIPTION OF THE PREFERRED EMBODIMENT

In the following, a preferred embodiment of the present invention is described by referring to the attached drawings.

In particular, according to the preferred embodiment, an API (as an example for a scan control device) is provided, which controls the scan operation such that the actual scan is performed independently from scan requests. That is, the actual scan is carried out at an own, independent timing.

Figure 1:
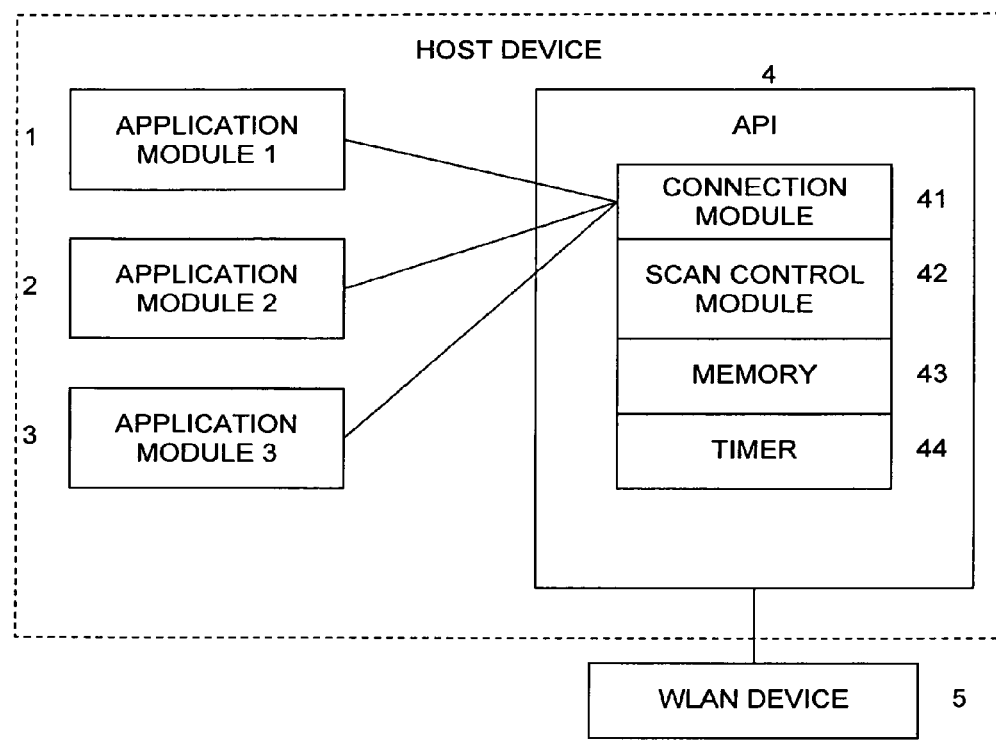
FIG. 1 shows a block diagram of a WLAN apparatus according to a preferred embodiment of the invention.
Figure 2:
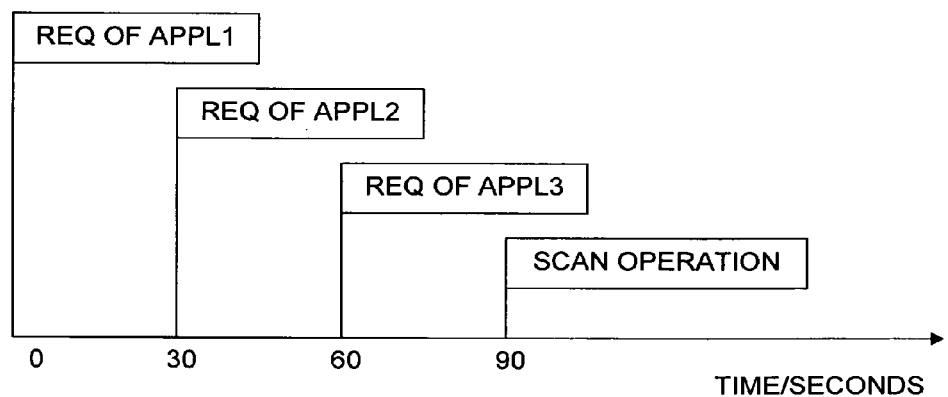
FIG. 2 shows timings of issuing scan request of several applications in order to illustrate the operation according to the preferred embodiment.
Figure 3:
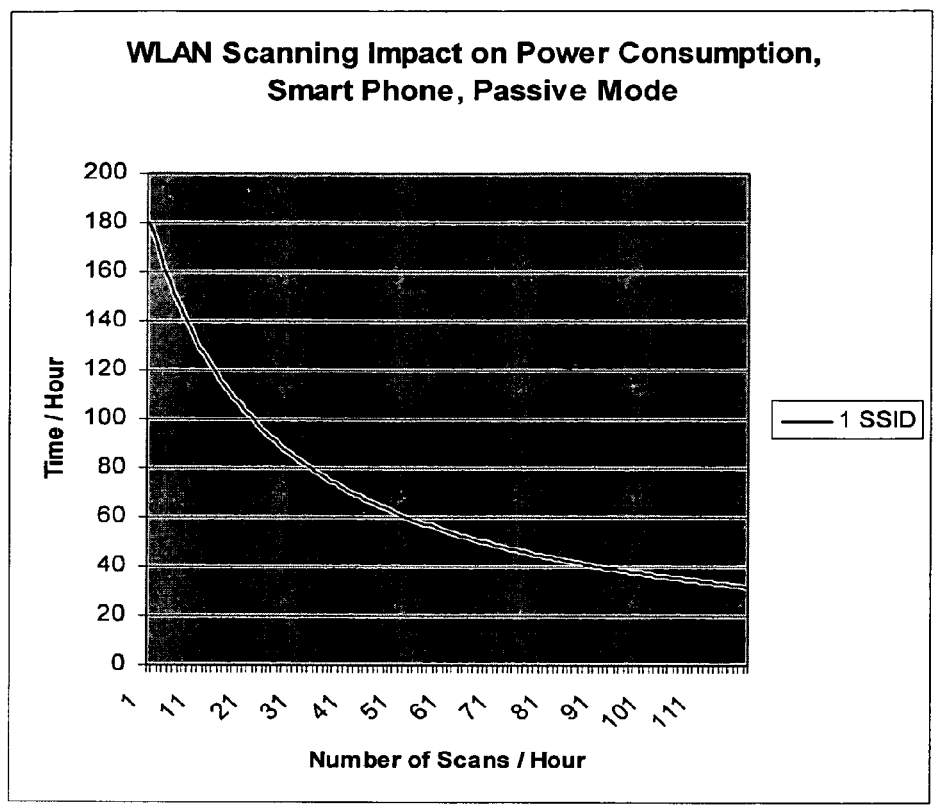
FIG. 3 illustrates WLAN scanning impact on power consumption according to the prior art.

This is described in more detail by referring to FIGS. 1 and 2.

FIG. 1 shows a block diagram of a WLAN station (as an example for an apparatus for wireless communication) according to the preferred embodiment, wherein three applications, i.e., application modules 1 to 3, an Application Programming Interface (API) 4 (as an example for a scan control device) and a WLAN device 5 are shown. The WLAN device 5 comprises a means for performing the actual scan, e.g., an antenna and a transceiver (not illustrated).

The WLAN station or WLAN apparatus comprise the WLAN device 5 and a host device, wherein in the host device the application modules 1 to 3 and the API are accommodated.

It is noted that the WLAN device can be a WLAN card to be inserted in a laptop computer, in a PDA (personal digital assistant), a mobile phone, a WLAN enabled device connected to the host by some other wireless technology e.g. bluetooth, a USB (Universal Serial Bus) stick inserted in a USB port of a laptop computer or a fixed personal computer or the like. In these cases, the laptop computer and the fixed personal computers are examples for host devices. Furthermore, the WLAN apparatus can be a laptop computer having an on-board WLAN functionality, a WLAN enabled phone or the like. In these cases, the WLAN device and the host device are arranged within one entity, and may only be logically separated.

In FIG. 1, three main parts of the API 4 are illustrated: a connection module 41 (as an example for a request receiving means) establishes a connection to the application modules 1 to 3 in order to receive scan requests and to send scan results, a scan control module 42 for performing the actual control of the scan operation, a memory 43 for storing scan requests or scan registrations, and also for storing programs, data etc, and a timer 44 for setting scan intervals.

According to the preferred embodiment, the connection module 41 receives a scan request from at least one of the application modules. This request is forwarded to the scan control module 42 which controls the scan operation independently from the reception of the scan request.

That is, according to the present embodiment, the SW (Software) subsystem of the WLAN station provides an API that allows various applications to register for a delayed scan event when ever the system scans. When system would do the scanning, all the applications would be let to know about the scan results as a scan event, instead of having then to poll the system themselves.

Hence, according to the present embodiment a centralized way of controlling when the actual WLAN scan happens is provided by separating the interface and implementation from the applications.

It is noted that the scan request can be a direct scan request, which is basically the same as the scan known in the prior art, or alternatively a registration for a scan event. The registration for a scan event means that the application informs the API that it would like to have scan results when the WLAN device actually performs a scan operation.

In the following, the operation according to the preferred embodiment is described by referring to FIG. 2. In FIG. 2, the timings of scan requests of the applications and the actual start of the scan operation are illustrated.

In this example, it is assumed that the application 1, which wants to initiate a WLAN connection when it sees a network 'a', decides to register itself for scan events. Application 1 decides then to also set that it would like the system to scan after every 2 minutes. This registration or request is issued at the beginning of the illustrated sequence, i.e., at 0 seconds.

Then, the application 2 is started 30 seconds later and it also wants to initiate a WLAN connection when it sees a network 'b'. Thus, it decides to register itself for scan events. It also sets its scan period to be 2 minutes.

Then, application 3 is started further 30 seconds later and it also wants to initiate a WLAN connection when it sees a network 'b' decides to register itself for scan events. It sets its scan period to be 3 minutes. This registration or request is issued at 60 seconds.

After 30 seconds the system (i.e., the WLAN device under control of the API 4, and in more detail, of the scan control module 42) scans and the scan results are delivered to all the applications simultaneously. As the maximum interval for the scan is two minutes (the interval of 3 minutes requested by the application 3 would be to long for the applications 1 and 2), the system waits for another two minutes after providing another scan results. That is, the scan control module 42 sets the timer 44 to two minutes, so that a scan operation is performed every 2 minutes.

In contrast thereto, according to the prior art, the scan operation would have been carried out immediately upon issuing the corresponding scan requests and then at each individual interval. That is, in average every 40 seconds the scan operation would have been carried out.

It is noted that the actual scan operation can be started at an arbitrary timing independent from the timings of issuing the scan requests. For example, a first scan operation can already be carried out immediately (e.g., 5 seconds) after receiving the first scan request from application 1. The applications 2 and 3, which issued their scan requests or registered to the scan event later, will be provided with the scan results upon the next scan operation, i.e., at 2 minutes and 5 seconds after the start.

Thus, according to the preferred embodiment the amount of power needed by the WLAN chipset (WLAN device) as well as the host processors (including API and applications) is reduced.

Hence, in order to implement this type of service, the API is adapted to allow applications to register for scan events or issue a scan request that will be pending on the WLAN subsystem until the subsystem actually performs scan, and then the call is returned, i.e., the scan results are delivered to the applications. Furthermore, the API allows some way of setting the maximum scan latency by the applications. This can be done either during the pending scan requests as a parameter or by setting a separate application specific MIB (Management Information Base).

The parameter during the scan request is referred to as a maximum pending timeout parameter with a pending scan request (asynchronous scan request). Many operating systems provide an asynchronous service that allows client send a message to service and still carry on executing its code path until it receives an indication about the completion of the request.

In the following, an implementation example for such a type of request from client side for this type is described, wherein a start with forced scan and then a move into a periodic mode is illustrated. It is noted that the following examples are written in a pseudo code based on the computer language C.

```
AsyncHandle handle;
MaximumScanLatency latency = 0;
ScanNetwork (latency, &handle, &ScanBuffer);
... execute other operations
ScanCompleteIndication(void* ScanBuffer){
    // Apparently the scan has completed
    ProcessScanRequest(ScanBuffer);
    // Let's resubmit the scan request to make scanning periodic
    latency = TrueMaximumValue;
    ScanNetwork(latency, &handle,&ScanBuffer);
}
```

From service side this might look like:

```
ScanNetworkRequest(MaximumScanLatency, AsyncHandle* hHandle,
void* ScanBuffer){
    CurrentBuffer = ScanBuffer;
    RequestHandle = hHandle;
    ....
    ....
}
TimerComplete( ){
    PerformScan(...);
}
ScanComplete(ScanResults* pResult ){
    CopyResults(CurrentBuffer, ScanResult);
    CompleteAsyncRequest(hHandle); // Completes the OS request and
indicated that to client
    ResetTime(Minimum(MaxScanLatencyList));
}
```

Hence, according to the present embodiment, it is possible to provide parameters with an asynchronous request, which is also referred to as a pending request.

It is noted that it is basically possible to force the subsystem to do the scanning right away by specifying the MaximumScanLatency to zero. However, this is only sensible for initial scan requests (or an "emergency scan request" after losing connection or the like), since this would imply that also during normal operation (i.e., after the starting procedure), scanning has to be performed all the time.

In the above example, this maximum scan latency is 2 minutes for applications 1 and 2, and 3 minutes for application 3. That is, the scan interval is set according to the minimum of maximum scan latencies of the applications, which is 2 minutes in the above example.

The system may perform a basic scanning right away when the first request is being issued, but after that all the framework initiated scans are synchronized together so that the maximum latency would always be respected.

Furthermore, if some other system events trigger scan (immediate scan request call etc.), then the framework will make use of the new scan requests by providing the scan information for application as well and basically resetting the timer again.

That is, in case an immediate scan operation is required, the scan control module 42 immediately performs the scan operation and resets the timer 44, so that the next scan operation is performed after the interval previously set with the timer 44.

Moreover, in case a new request is issued or another application registers to the scan event, the interval can be adapted. That is, in case an application 4 in the above example needs to have a scan operation every 1 minute, than the interval is to 1 minute, so that also the value of the timer 44 would be rewritten to 1 minute. A similar operation is carried out when an earlier request or registration is modified, namely when, for example, it is for some reason necessary for application 1 to have a scan operation every 1 minute.

To applications, the type of scanning according to the present embodiment would look like a delayed scan request but most of the applications would not care about this as usually scanning is anyway a periodic operation.

That is, in a practical implementation, it is not necessarily required to adapt the applications to the scan procedure according to the present embodiment. They can simply issue scan requests as in the prior art, but will receive the results delayed.

That is, the scan requests may be simply stored in the memory 43, and when the scan result is sent to the application modules 1 to 3, the scan control module 42 refers to the stored scan request in order to address the corresponding application module, for example.

However, as already mentioned above, alternatively the application can register to the scan event.

Hence, according to the present embodiment, the power-consumption due to scanning operations can be significantly reduced. That is, the stand-by time of a WLAN station (such as a mobile phone, a laptop computer or the like with WLAN functionality) can be considerably prolonged.

Moreover, also the traffic due to scanning is reduced so that radio resources may be saved.

The more applications there are, the more benefits from power-consumption point of view can be achieved. Having system initiated scanning can also help applications to react for certain events. For example, when connection gets bad, the system will start performing an automatic scan operation immediately in order to roam. Then, all the scan results are being delivered to the applications, which gives them more time to adapt to the low signal conditions.

Namely, if, by using the conventional technique, all applications would start doing separate scanning, and one scan would take 0.5 seconds, then, in a case of five applications, the last application would get its result after 2.5 seconds. In contrast thereto, all applications receive the scan results after the first scan, i.e., after 0.5 seconds.

Hence, according to the present embodiment, an application transparent way of doing scanning is provided so that as many applications as possible could use the same scan results, so that no every application would be doing this scanning on their own.

Further possibility to benefit from this invention in WLAN station power consumption sense is that the WLAN station can be set to operate in a low power mode. In such case there would be a limit for the scanning frequency. Such a limit could be e.g. one scan per 30 s. Since scanning would not be made more often, the applications registered for scan events might have to settle for the same scan result several times. Nevertheless, there would be the advantage of performing scans for all the registered applications instead performing scans for all the applications separately and simultaneously save power.

The invention is not limited to the embodiment described above, and various modifications are possible.

For example, the invention is not limited to WLAN, but can also be applied to other radio networks in which it is necessary to perform a scan operation in order to detect access networks.

The invention can also be realized by a computer program product. The computer program product, i.e., the computer code may be stored on a medium, e.g., a memory card, a RAM (Random access memory) or a ROM (read only memory), a hard drive, a CD-ROM or a DVD-ROM.

In this case, the different applications described above are application program modules, and the API is realized as an API program module.

The invention claimed is:

1. An apparatus, comprising:
   a processor; and
   a transceiver for wireless communications;
   a memory including a computer program code,
   the memory and the computer program code configured to, with the processor, cause the apparatus at least to
   process a plurality of requests from a plurality of applications to provide scan information, and
   process a plurality of latency parameters, each of the latency parameters comprising an indication of a requested interval for performing scan operations for one of the plurality of applications,
   wherein an apparatus interval for performing the scan operations is based on a smallest value of the latency parameters;
   wherein, when an initial scan operation is required, perform the initial scan operation and perform subsequent scan operations according to the apparatus interval,
   wherein, in the initial and subsequent scan operations, a network detection is performed; and
   provide the scan information obtained based on the initial and subsequent scan operations to the plurality of the applications.

2. The apparatus according to claim 1, wherein the apparatus interval is adapted when a new request for scan information from at least one of the applications is processed.

3. The apparatus according to claim 1, wherein the apparatus is configured to operate in a low power mode and, when the apparatus is in the low power mode, a limit is set for a frequency of the scan operations.

4. The apparatus according to claim 1, wherein the apparatus further comprises a scan control module implemented in an application programming interface (API) configured to allow the applications to register for scan events or issue a scan request that will be pending on a network subsystem until one of the scan operations is performed.

5. The apparatus according to claim 1, wherein, based on connection quality, the initial scan operation is automatically performed immediately and the scan information is provided to the applications.

6. The apparatus according to claim 1, wherein the network detection comprises a scan for at least one access network.

7. The apparatus according to claim 1, wherein the at least one memory and the computer program code are further configured, with the at least one processor, at least to provide the scan information as a scan event.

8. The apparatus according to claim 1, wherein each of the requests from the plurality of applications to provide scan information further comprises a latency parameter indicating a maximum latency value.

9. The apparatus according to claim 8, wherein the maximum latency value indicates a maximum delay time by which a scan operation may be delayed.

10. The apparatus according to claim 1, wherein the apparatus comprises a wireless local area network apparatus.

11. A method, comprising:
processing, at a scan control apparatus, a plurality of requests from a plurality of applications to provide scan information, and
processing a plurality of latency parameters, each latency parameter comprising an indication of a requested interval for performing scan operations for one of the plurality of applications,
wherein an apparatus interval for performing the scan operations is based on a smallest value of the latency parameters,
wherein, when an initial scan operation is required, performing the initial scan operation and performing subsequent scan operations according to the apparatus interval,
wherein, in the initial and subsequent scan operations, a network detection is performed; and
providing the scan information obtained based on the initial and subsequent scan operations to the plurality of the applications.

12. The method according to claim 11, wherein the apparatus interval is adapted when a new request for scan information from at least one of the applications is processed.

13. The method according to claim 11, further comprising setting a limit for a frequency of the scan operations when the scan control apparatus is operating in a low power mode.

14. The method according to claim 11, wherein the scan control apparatus further comprises a scan control module implemented in an application programming interface (API) configured to allow the applications to register for scan events or issue a scan request that will be pending on a network subsystem until one of the scan operations is performed.

15. The method according to claim 11, further comprising, based on connection quality, automatically performing the initial scan operation immediately and providing the scan information to the applications.

16. The method according to claim 11, wherein the network detection comprises a scan for at least one access network.

17. A computer program, embodied on a non-transitory computer readable medium, the computer program configured to control a processor to perform a process, comprising:
processing a plurality of requests from a plurality of applications to provide scan information, and
processing a plurality of latency parameters, each latency parameter comprising an indication of a requested interval for performing scan operations for one of the plurality of applications,
wherein an apparatus interval for performing the scan operations is based on a smallest value of the latency parameters,
wherein, when an initial scan operation is required, performing the initial scan operation and performing subsequent scan operations according to the apparatus interval,
wherein, in the initial and subsequent scan operations, a network detection is performed; and
providing the scan information obtained based on the initial and subsequent scan operations to the plurality of the applications.

18. The computer program according to claim 17, wherein the apparatus interval is adapted when a new request for scan information from at least one of the applications is processed.

19. The computer program according to claim 17, further comprising setting a limit for a frequency of the scan operations when the scan control apparatus is operating in a low power mode.

20. The computer program according to claim 17, further comprising allowing the applications to register for scan events or issue a scan request that will be pending on a network subsystem until one of the scan operations is performed.

21. The method according to claim 11, wherein the providing further comprises providing the scan information as a scan event.

22. The method according to claim 11, wherein each of the requests from the plurality of applications to provide scan information further comprises a latency parameter indicating a maximum latency value.

23. The method according to claim 22, wherein the maximum latency value indicates a maximum delay time by which a scan operation may be delayed.

24. A mobile device, comprising:
at least one processor; and
at least one memory including computer program code,
the at least one memory and the computer program code configured to, with the at least one processor, cause the apparatus at least to
process a plurality of requests from a plurality of applications to provide scan information, and
process a plurality of latency parameters, each of the latency parameters comprising an indication of a requested interval for performing scan operations for one of the plurality of applications,
wherein an apparatus interval for performing the scan operations is based on a smallest value of the latency parameters;
wherein, when an initial scan operation is required, perform the initial scan operation and perform subsequent scan operations according to the apparatus interval,
wherein, in the initial and subsequent scan operations, a wireless local area network (WLAN) detection is performed; and
provide the scan information obtained based on the initial and subsequent scan operations to the plurality of the applications,
wherein the scan information is used by location technology.

* * * * *